United States Patent
Walsh et al.

[11] Patent Number: 5,746,255
[45] Date of Patent: May 5, 1998

[54] COMPOUND HOSE SYSTEM

[76] Inventors: Roger C. Walsh, 184 Front Street, Belleville, Canada, K8N 2Y9; Douglas W. Eggins, 129 Daphne Crescent, Barrie, On., Canada, L4M 2Y7

[21] Appl. No.: 365,734

[22] Filed: Dec. 29, 1994

Related U.S. Application Data

[63] Continuation-in-part of Ser. No. 209,981, Mar. 11, 1994, Pat. No. 5,445,356.

[51] Int. Cl.$^6$ .................... F16L 9/18; F16L 55/04
[52] U.S. Cl. .................. 138/115; 138/28; 138/30; 138/109
[58] Field of Search .................. 138/115, 116, 138/114, 119, 28, 30, 46, 93, 149, 109; 137/852, 843, 877; 251/61.1; 239/106, 566

[56] References Cited

U.S. PATENT DOCUMENTS

| | | | |
|---|---|---|---|
| 2,067,078 | 1/1937 | Faber | 138/115 X |
| 2,734,462 | 2/1956 | Schaefer | 138/28 X |
| 2,753,215 | 7/1956 | Barr | 138/115 X |
| 3,567,134 | 3/1971 | Smith | 138/118 X |
| 3,626,985 | 12/1971 | Erickson | 138/115 |
| 3,698,195 | 10/1972 | Chapin | 138/114 X |
| 3,903,929 | 9/1975 | Mock | 138/115 |
| 3,998,392 | 12/1976 | St. Clair | 239/566 X |
| 4,215,726 | 8/1980 | Tagami | 138/28 X |
| 4,272,021 | 6/1981 | Standal | 138/28 X |
| 4,368,219 | 1/1983 | Nagata et al. | 239/106 X |
| 4,410,013 | 10/1983 | Sasaki et al. | 138/115 X |
| 4,590,971 | 5/1986 | Webster et al. | 138/149 |
| 5,083,742 | 1/1992 | Wylie et al. | 251/61.1 |

*Primary Examiner*—Patrick Brinson
*Attorney, Agent, or Firm*—D. W. Eggins

[57] ABSTRACT

A frost-free water supply system drains down to avoid freeze-up during non-pumping periods, its operation being responsive to air pressure within the system. A compound hose used may have an inner hose part co-extruded with the outer hose. The inner hose portion is preferably of flattened section, which facilitates threading of the inner hose within the outer hose, when not co-extruded. The compound hose with a flattened inner section, when its air cavity is sealed at atmospheric pressure conditions, provides an inbuilt air cushion that can generate initial de-watering pressure as high as about 716 gms per square cm (10 psi). The elastic memory, due to its initial flattened shape, also contributes to the de-watering capability of the inner hose. One unepected result, upon draining the liquids, is an unusual "bump" in the residual pressure of the air trapped within the outer hose, whereby the inner hose is more thoroughly flattened and more completely de-watered. Natural or synthetic rubbers may be used, parcticularly for the inner parts. The sealed enclosure of the pipeline by way of the end-fittings when under atmospheric conditions, ensures that in the drained condition the entrapped air returns substantially to atmospheric pressure. As this state prevails for much of the time, the likelihood of air leakage is greatly diminished, while the adverse effects thereof are minimized.

19 Claims, 2 Drawing Sheets

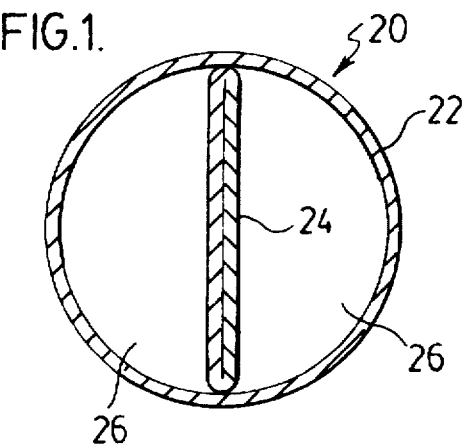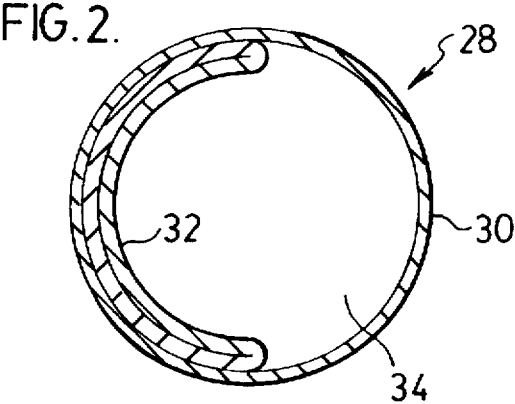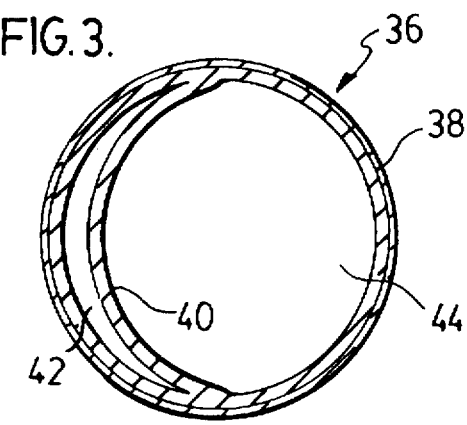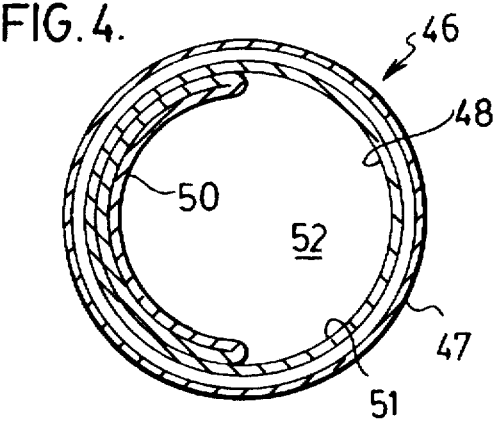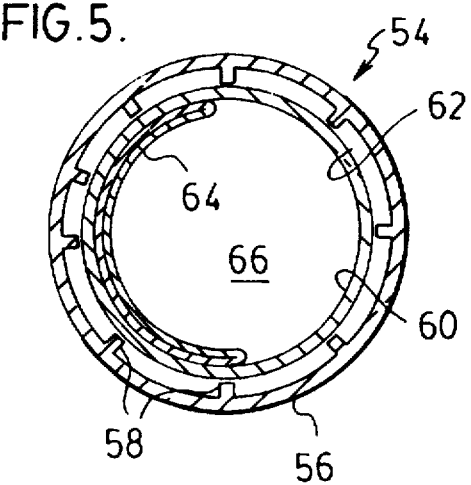

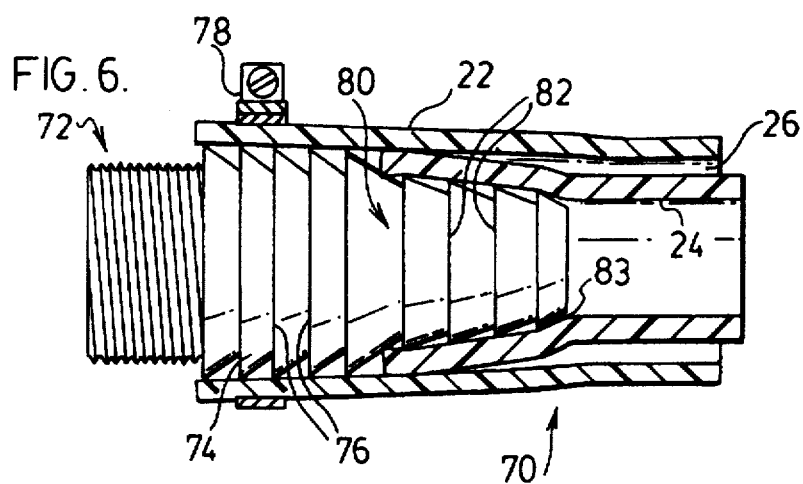
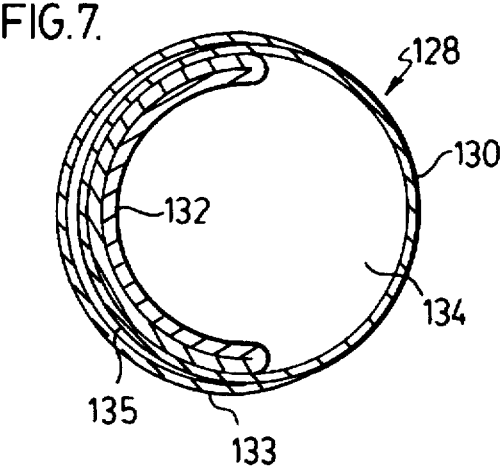
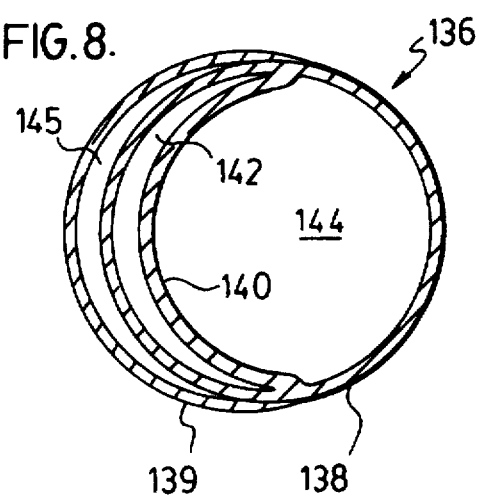
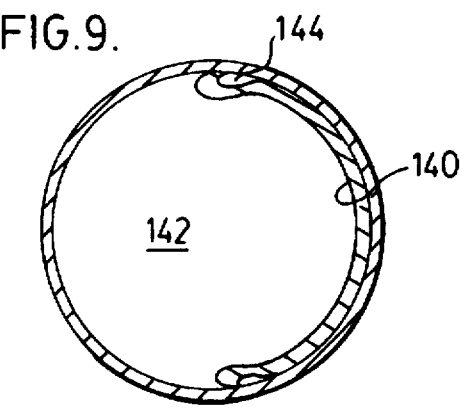
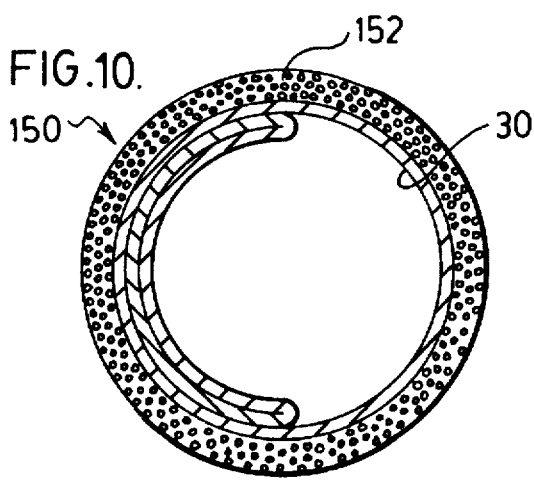

COMPOUND HOSE SYSTEM

TECHNICAL FIELD

This invention is directed to a pneumatic pressure responsive frost free hose for use in a so-called "frost free" water pipeline supply system. This application is a continuation-in-part of our application Ser. No. 08/209,981 filed Mar. 11, 1994 now U.S. Pat. No. 5,445,356.

BACKGROUND ART

The weather-proofing of water systems to prevent freeze-up and associated damage has been the focus of many patents. However the search for reliable, low-cost systems still proceeds in view of the defects, drawbacks and high installed and operating costs of the systems presently available.

The present invention forms a part of the invention previously disclosed in our pending U.S. application, Ser. No 08/209,981 filed Mar. 11, 1994.

The invention is closely associated with the subject matter found in Canadian Patent No. 1,122,877 Gauthier, May 1971.

One of the drawbacks of the earlier Gauthier system has been the absence of a reliable, low cost weather-proof (i.e. freeze-insensitive or "frost-free") hose.

The prior art Gauthier hose provision comprises a smaller diameter hose threaded through the interior of a larger outer hose. The inner hose has a thick wall that stretches under pumping pressure, so as to provide elastic, contractive energy upon the cessation of pumping, to thereby assist in the expulsion of water from the inner hose, as an effective portion of the dewatering process.

Previous manufacture of the inner and outer hoses as separate entities, with their combination into the desired frost-free format required their assembly by drawing the smaller hose within the larger hose. Due to the practical difficulties involved in this "threading" operation, the length of such a compound hose was limited to about approximately thirty two meters (i.e. about one hundred feet), the threading operation being both difficult and time consuming.

DISCLOSURE OF INVENTION

The present invention provides a compound frost free de-waterable hose, suitable for making up into extended length pipelines far in exess of the former practical limit of about 32-meters (100 feet)

Operation of any water installation at temperatures well below zero Fahrenheit (minus 18 Centigrade) requires rapid and reliable de-watering, once pumping and full flow are terminated, as otherwise the de-watering valve or valves may themselves freeze-up, thus exposing the remaining line contents to possible freeze-up.

Use of an improved hose in accordance with the invention may utilize the elastic memory of the inner hose to assist in the dewatering operation.

The improved hose may also make possible the operation of the system solely utilizing the pressure of air entrapped between the inner and the outer hose at atmospheric pressure when the hose is made up, in order to dewater the hose.

We have found that an embodiment utilizing hoses dimensioned 2.54 cm. (1-inch) inner diameter for the outer hose, and 2.222 cm. (0.875 ins) outer diameter for an inner hose of 1.91 cm ((0.75 ins.) inner diameter achieves eminently satisfactory de-watering, under residual (atmospheric) air pressure. Capping off at atmospheric pressure the air entrapped adjoining the inner hose or its equivalent, when the hose is made up, can result in the generation of air pressure in the order of 716 gms/sq.cm. (10 psi) when the inner hose is filled, and expands to its working volume. This pressure rise is due to the increase of cross-sectional area of the inner hose, under the application of water or other liquid at pumping pressure, which compresses the atmospheric air entrapped within the compound hose, in the fashion of an inbuilt spring.

In addition to the foregoing advantages, considerable cost improvements arise, when using a hose or hose portion produced in a flattened condition, so as to impart memory leading to a tendency to self-empty due to contraction of its cross sectional area. The flattened shape can improve handling, particularly in the case where the inner hose is not co-extruded, and is assembled by threading it through the outer hose. Also, a thinner walled inner hose may be used, with consequent material savings, in contrast to the former Gauthier thick-walled inner hose.

It has been found that an unusual and unexpectedly beneficial result arises from the present system, in that it appears to generate a jump or "bump" in the residual air pressure surrounding the inner hose, so as to enhance the de-watering of that hose when drainage takes place. A "flat" inner hose that is extruded having a slight inner air space may be substantially dewatered due to the effects of this "bump". Assembly at atmospheric pressure also minimizes air loss, as the pipeline, when de-watered is substantially at atmospheric pressure.

The subject hose has a wide range of uses, including that of an off-season garden hose, and other out-door uses, where the possibility of freeze-up may exist, and where automatic de-watering is important. In one embodiment, preferably manufactured by coextrusion, the inner hose portion is extruded both substantially flattened and also curved in substantial conformity with the inner surface of the outer hose portion. In use, admission of water to the collapsed inner hose causes it to open up to its full cross-sectional area, for optimum flow capacity. At the same time, the pressure of residual air in the cushion is increased, which serves to restore the inner hose portion to its original collapsed condition upon termination of pumping activity. This restoration displacement is aided by the plastic memory of the inner hose portion and also by the discovered "pressure bump".

Another embodiment, of extruded section, has a transverse curved diaphragm that divides the outer hose into a major (air) containing cross-sectional area segment and a minor area segment into which the water or other liquid is admitted. In use, this application of liquid pressure expands the minor segment area to substantially include the whole of the cross-sectional area of the hose, by reversing the curvature of the diaphragm and stretching it into near-conformity with the opposed inner surface of the outer hose portion. This action compresses the air that is encapsulated within the hose, in the manner of a spring, and serves to de-water the hose, upon cessation of pumping. The dewatering action is assisted by the plastic memory of the partition member, and probably also by the "air bump" phenomenon. A further embodiment may have a double-walled outer hose portion, in combination with a single diaphragm, or alternatively with an inner hose of flattened extruded section. The double-walled outer hose may comprise a high-tensile outer wrap to provide wall supplemental strength to complement the adjoining inner wall portion. The outer wall portion of the double walled hose may be spaced from the inner wall portion, so as to provide an air space about the inner wall portion, to serve as thermal insulation therefor. In use, the admission of water under pressure expands the innermost water hose portion into load transfer relation with the inner wall portion of the outer hose, by air compression. This in turn expands the inner wall of the outer hose into load transfer relation with the outer wall of the outer hose portion, again by air cushion compression.

A modification of this arrangement may include a series of spacer ribs separating the outer hose inner and outer wall portions, to maintain the arrangement in symetrical, co-axial relation; alternatively, a layer of thermally insulative rubber may be applied, preferably by extrusion.

A further "insulated" embodiment may comprise a pipeline having an extruded curved inner diaphragm within and adjacent a portion of an outer hose wall, and outside that hose wall there may be provided an auxiliary, air containing wall segment approximating to the angular location and extent of the inner diaphragm. In use, when in a dewatered or in a liquid transfer state, the water (or other liquid) within the liquid transfer portion of the pipeline would then be insulated on two sides by entrapped air cushions.

As an alternative to the use of plastics, certain manufacturing, cost and functional benefits may derive from the use of natural or synthetic rubbers, particularly in the inner hose detail. An improved end fitting provides a first inner portion having a smooth, gradually expanding surface over which the inner hose portion may be slid, with a saw-tooth outer surface that terminates at a shoulder. An adjoining portion of larger diameter, with a saw toothed outer surface receives the outer hose portion thereover, in radial compressing relation with the end of the inner hose portion. A pair of hose clamps may be used, so as to clamp the outer hose in securing, compressing relation with the inner hose, the axially outermost clamp providing a back-up air seal, over the outer hose portion.

BRIEF DESCRIPTION OF THE DRAWINGS

Certain embodiments of the invention are described by way of illustration, without limitation of the invention thereto, other than as defined by the following claims, reference being made to the accompanying drawings, wherein;

FIG. 1 is a diagramatic cross section of a first hose embodiment in accordance with the invention;

FIG. 2 is like view of a second hose embodiment;

FIG. 3 is a like view of a transverse diaphragm embodiment;

FIG. 4 is a like view of a double-walled outer hose embodiment;

FIG. 5 is a like view of a double-walled outer hose embodiment incorporating annular spacers;

FIG. 6 shows a portion of a made-up hose end, in part section, in accordance with the present invention;

FIGS. 7 and 8 are views similar to those of FIGS. 2 and 3, and embodying an auxiliary outer arcuate air insulation for an inner hose and diaphragm embodiment respectively;

FIG. 9 shows the FIG. 3 embodiment with a reversed diaphragm; and, FIG. 10 shows an embodiment having foamed insulation.

DETAILED DESCRIPTION OF THE INVENTION

Referring to FIG. 1, the illustrated arrangement 20 comprises an outer hose 22 having an inner hose 24 therein. The inner hose 24 is extruded "in the flat", substantially as illustrated. The inner hose 24 may be separately extruded, or co-extruded with the outer hose 22. While shown completely flat, a slight clearance may be provided. The inner hose 24, in its "flat" state forms air spaces 26,26 between it and the outer hose 22. In use, upon the making up of a pipeline 20, the application of end fittings of the type illustrated in FIG. 6 to both ends of the compound hose serves to seal off the air spaces 26, to form a sealed chamber. Upon the admission of water or other suitable liquid to the inner hose 24, the inner hose 24 deforms under the internally applied pressure so as to expand to a substantially circular section, thereby compressing the air within the sealed air chamber 26. The air chamber 26 takes up a generally annular configuration, concentric with the now-rounded inner hose 24. An internal air pressure as high as 716 gms/sq cm.(10 psi) or possibly even greater may be thus generated.

Referring to FIG. 2, this shows a pipeline 28 having an outer hose 30 and an inner hose 32 in internally wrapped relation substantially against the inner surface of the outer hose 30. In the condition shown, and with the remote ends of the inner hose 32 sealed by an end fitting, such as that illustrated in FIG. 6 to the outer hose 30, this forms an enclosed air space 34, extending substantially the full length of the pipeline. This pipeline 28 acts in the same fashion as that described above in relation to the pipeline 20.

Referring to the FIG. 3 embodiment, a pipeline 36 has an outer hose portion 38 with an integral diaphragm portion 40 co-extruded therewith. The space 42, in operation, constitutes the water passage, which expands under internal water pressure to occupy most of the interior of the outer hose 38, except for a residual air space into which the atmospheric air content of the original air space 44 is compressed.

In an alternative approach, the space 44 of the FIG. 3 embodiment may be used as the water transfer passage. In this case, the space 42 is initially inflated so as to reverse the diaphragm 40, thereby taking up most, or all of the space 44, when in the de-watered condition. Then, upon commencement of liquid pumping, to inflate and fill the space 44 with the liquid being transferred, the now-loaded diaphragm 40 more nearly reverts to its natural curvature. At the termination of pumping the air-loaded diaphragm 40 reverses its curvature, to displace the liquid from the space 44. In its fully reversed condition, the diaphragm 40 is also in a low-load condition, such that the reversed curvature occurs at low stress levels. It will be understood that such usage requires the injection of a quantity of air to the space 42 sufficient to reverse the diaphragm 40 so as to take up the space 44, when making up the pipeline by applying the sealing end fixtures of FIG. 6 (or equivalent) as pipeline ends. In the FIG. 4 embodiment, the pipeline 46 has an outer wall 47, preferably of a high strength engineering plastic containing an inner wall portion 48, which may be more elastic than the outer wall portion 47. The intervening space 51 forms a sealed air chamber, which serves in operation as both a thermal and shock insulation, and as a stress transfer medium, such that the internal air pressure loading upon the inner wall portion 48 is shared with the outer wall portion 51. The inner hose portion 50 is illustrated as being extruded in flattened form, so as to possess plastic memory, and constitutes the water pathway, when expanded under hydaulic pressure. As in the foregoing cases, the pressurization of the inner hose 50 to transfer water serves to pressurize the respective air spaces 52, 51. Upon the cessation of water pumping, the air pressure in the reduced space 52 serves to de-water the inner hose 50, which action is assisted by the plastic memory of the hose 50.

In the case of the FIG. 5 pipeline 54 embodiment, the annular spacing of the inner wall 60 from its outer wall portion 56 is facilitated by the provision of spacer ribs 58. These spacer ribs 58 are illustrated as being part of the outer hose wall 56, but may instead constitute part of the inner wall 60. In all other respects the double-walled outer hose 56/60 with its annular air space 62 cooperates with the inner hose 64 to provide, in combination with the appropriate end fittings a self de-watering pipeline, having sealed air-filled spaces, the inner one of which serves to assist in dewatering the pipeline when water pumping is terminated; the outer one of the air spaces serving both as thermal insulation, and as a load transfer agent between the inner wall portion 60 and the outer wall portion 56.

Referring to FIG. 6, a hollow cylindrical end fitting 70 is illustrated as having a tapered pipe thread portion 72 on its outer end; an adjoining portion 74 has ribbed serrations 76 over which an outer hose, such as 22; 30; 38; 47/48; or 56/60 is secured in sealing relation by way of clamps 78. The entry 83 may be oval, like the hose. A taper-reduced portion 80 of the fitting 70 has ribbed serrations 82 to receive the inner hose 24; 32; 50; 64, or diaphragm 40 in sealed liquid conducting relation therewith. This serves to seal off the respective air spaces 26; 34; 44; 52 and 51; 66 and 62 of the respective hoses, thereby enabling them to operate in the described dewatering mode, in the fashion of pneumatic springs, or as a load transfer agent, or as a thermal insulant.

In the case of the diaphragm 40, the curvature of the diaphragm is reversed when it is fitted over the end fitting 70, in order that the space 42 is in sealed, water-flow conducting connection with the through passage of the end-fitting 70.

It will be understood that the end fitting 70 may connect to appropriate other fittings of a system, or alternative end fittings possessing similar sealing characteristics may be substituted.

The end fitting 70 has a relieved inner end nose portion 83 about which the inner hose 24 or its equivalents can fold, without undue stress or cutting.

The fit of inner hose 24 upon the toothed profile 82 in sealing relation therewith is terminated at a shoulder, the inner hose 24 being secured by the outer hose 22 in pressing relation thereabout. Referring to the FIGS. 7 and 8 embodiments, an outer casing extension 133, 139, respectively encloses an air-filled insulation space, respectively 135, 145. The act of applying a pair of end fittings 70 in clamped relation to each of the pipelines 128, 136, serves to enclose the respective air spaces of each pipeline in sealed relation, such that substantially atmospheric air pressure is trapped in the air spaces 134, 135, and 144, 145. Upon the pumping of liquid through the respective hose portions 132, 142, the respective major air spaces 134, 144 are greatly diminished, but remain as narrow, crescent-shaped air insulation spaces. These spaces are complemented by the other peripheral air spaces 135, 145 respectively. These latter air spaces may be somewhat diminished in thickness due to the effects of pressurization upon the system. This, in turn, may assist in generating the pressure "bump" phenomenon upon emptying of the liquid from the system. It will be seen that in a de-watered condition the air content of the respective pipelines is substantially at atmospheric pressure, such that the tendency to leak air is minimized.

Referring to FIG. 9, the space 142 is increased by the admission of air, so as to reverse the curvature of the diaphragm 140, when in the illustrated dry, unloaded condition. The air present within the space 144 will be vented to atmosphere through the centre of fitting 72, to which the space 144 is directly connected. Upon the passage of water under pumping pressure to the through-space 144, the diaphragm 140 will reverse to its natural direction of curvature, so that under working conditions, when the internal pressure and applied forces are highest, the diaphragm 140 will be displaced by the pressurized water or other liquid into its natural shape, as extruded, that illustrated in FIG. 3.

Referring to FIG. 10, the embodiment 150 has an insulating layer 152 comprising foamed rubber or the like, illustrated as extending about the full periphery of the hose 30. It will however be understood that the peripheral extent of the insulating layer 152 may be limited to a desired portion or portions of the hose 30.

What I claim by Letters Patent of the United States is:

1. An elongated, substantially flexible pipeline for use in transferring a liquid, said pipeline comprising an outer hose having an imperforate wall connecting an inlet end and an outlet end of the outer hose; an elastic wall within the hose providing an enclosed air space extending substantially the full length of the pipeline; two end fittings receiving said elastic wall and said outer wall in secured sealing relation, each end fitting having an inner end portion of reduced outer diameter, to receive said elastic wall in secured sealing relation therewith, and an adjoining end portion of said end fitting of larger outer diameter, to receive said outer hose in secured sealing relation therewith; two removable clamps; a first said removable clamp sealingly securing said outer wall to said fitting adjoining end portion, and a second said removable clamp compressing said outer wall wall to said fitting inner end portion in mutually securing, hermetic sealing relation; whereby, in use, upon admission of liquid under pressure through a said end fitting, said elastic wall is displaced transversely within said outer hose, to provide a substantially unimpeded flow path for said liquid to the other said end fitting; and upon termination of said admission under pressure, said air space expands to compress said flow path and to discharge said liquid from said pipeline.

2. The pipeline as set forth in claim 1, said elastic wall comprising a flattened inner hose; said end fittings each having a peripheral shoulder against which said inner hose abuts.

3. The pipeline am set forth in claim 1, said elastic wall comprising a diaphragm having the edges thereof attached in mutually spaced-apart relation to an inner wall surface of said outer hose.

4. The pipeline as set forth in claim 2, said flattened inner hose being curved in substantial conformity with said adjacent inner surface of said outer hose.

5. The pipeline as set forth in claim 1, said outer hose having a double wall construction.

6. The pipeline as set forth in claim 5, said double wall construction including an intermediate air space located within said double wall construction.

7. The pipeline as set forth in claim 1, said air space containing air initially entrapped therein substantially at atmospheric pressure.

8. The pipeline as set forth in claim 6, including spacer means located within said intermediate air space, in spacing relation with inner and outer wall portions of said double wall construction.

9. The pipeline as set forth in claim 1, including a segment of hose wall extending about a portion of said outer hose, in spaced relation therefrom, to form an enclosed space therebetween.

10. The pipeline as set forth in claim 9, said enclosed space including air in trapped relation therein, to provide a thermal insulation to the pipeline.

11. The pipeline as set forth in claim 3, including a quantity of air entrapped between said diaphragm and said inner wall surface sufficient to change the curvature of said diaphragm, to expel said liquid from said pipeline in the absence of applied liquid pressure within the pipeline.

12. The pipeline as set forth in claim 11, said diaphragm being displaced into substantial adjoining relation with a portion of wall of said outer hose, in liquid discharging relation with said pipeline, when de-pressurized.

13. The pipeline as set forth in claim 1, said elastic wall being initially displaced by air pressure into arcuate curved relation opposed to the plastic memory of said elastic wall.

14. The pipeline as set forth in claim 1, wherein at least said elastic wall portion thereof consists of rubber.

15. The pipeline as set forth in claim 2, at least said flattened inner hose portion thereof being of rubber.

16. The system as set forth in claim 1, said end fittings each having said two removable clamps, to hermetically seal said internal air chamber within the pipeline, said first clamp serving as a back-up air seal to said second clamp.

17. A pipeline for use in transmitting a liquid, said pipeline comprising an outer hose, and a curved elastic wall within the hose initially curved in substantial conforming relation with an adjacent inner surface portion of said outer hose, providing an enclosed air space extending substantially the full length of the pipeline and deformable under applied pressure into reversely curved, near conformity with a portion of said outer hose wall substantially opposed to said adjacent hose portion; a limited portion of the periphery of said outer hose adjacent said initially curved wall comprising an insulated wall.

18. The pipeline as set forth in claim 17, said insulated wall portion comprising a foamed elastomer.

19. The pipeline as set forth in claim 18, said foamed elastomer being of closed cell construction.

* * * * *